July 30, 1957  J. L. CALLAHAN  2,801,064
PROTECTIVE SADDLE DEVICE FOR PIPES
Filed May 21, 1954
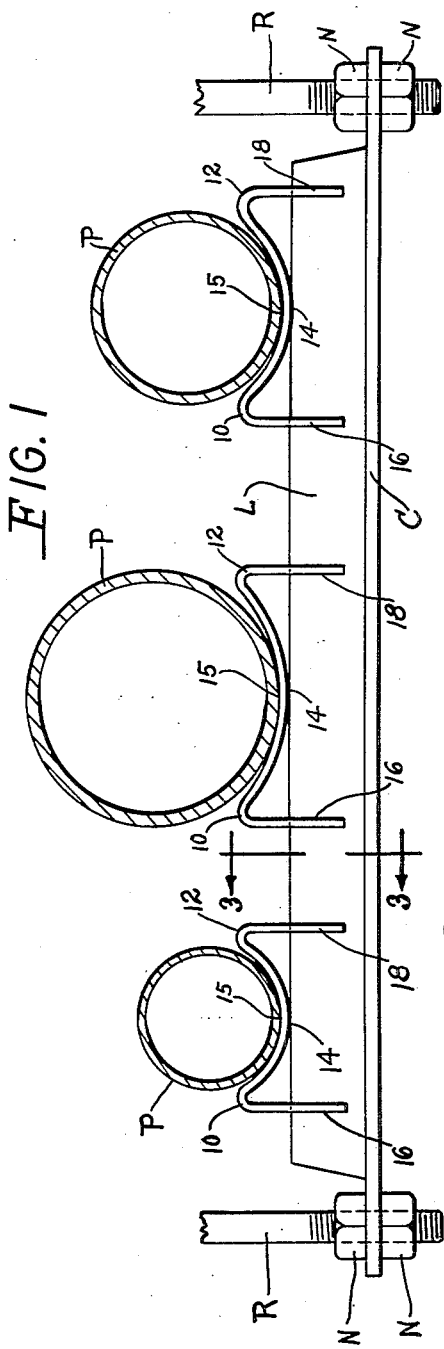
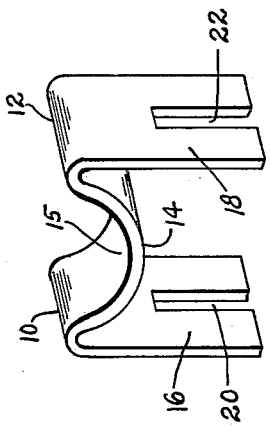
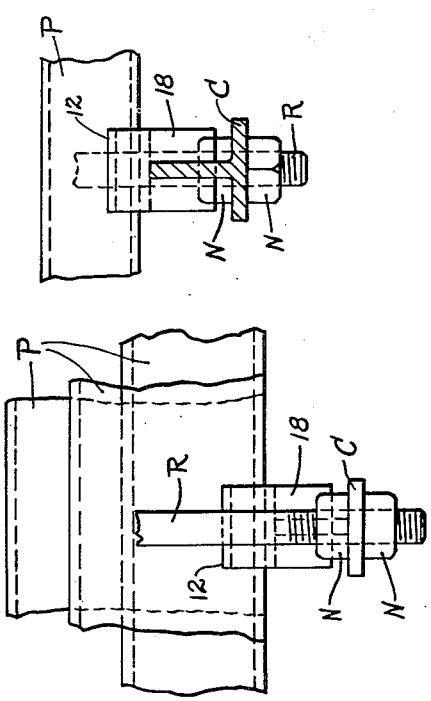
INVENTOR.
John L. Callahan
BY Harold E. Cole
Attorney

2,801,064

PROTECTIVE SADDLE DEVICE FOR PIPES

John L. Callahan, Quincy, Mass.

Application May 21, 1954, Serial No. 431,561

1 Claim. (Cl. 248—58)

This invention relates to a saddle device to protect pipes, and the like, resting on supports.

One object of my invention is to provide a protective saddle device that can readily be mounted on a pipe hanger support, upon which devices said pipes and the like are adapted to rest, and be protected from corrosion.

Another object is to provide such a protective saddle device which can be made in various sizes, yet each size will rest directly on the pipe hanger in the same plane.

A further object is to provide such a protective saddle device that is simple in construction, is relatively inexpensive to manufacture, and which can be mounted on a pipe hanger support instantly.

The foregoing and other objects which will appear as the nature of the invention is better understood, may be accomplished by a construction, and arrangement such as is disclosed by the drawing. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claim.

In the drawings:

Figure 1 is a front elevational view showing a pipe hanger assembly in suspended position with a plurality of my protective saddle devices, of different sizes, mounted thereon, and on which various sizes of pipes, shown in section, lie.

Figure 2 is an end elevational view of the same, broken away.

Figure 3 is a sectional view taken on the line 3—3 of Figure 1.

Figure 4 is a perspective view of my protective saddle device.

As illustrated, my saddle device has the usual raised portions 10 and 12 at the sides, the outer surfaces of which are curved, between which is the sunken, seat portion 14 that is concave-shaped as shown, and provides a bearing surface 15 for a purpose later explained. Extending from said raised portions 10 and 12 respectively are leg portions 16 and 18, which constitute the side dependencies of my device. In each of said leg portions 16 and 18, extending inwardly from the outside extremity, is a slot, given the numerals 20 and 22 respectively.

Each slot extends inwardly to a point that is in alinement with the under surface of the deepest portion of said sunken seat portion 14. In other words, the inner ends of said slots are in the same horizontal plane as the under surface of the deepest portion of the sunken seat portion 14, as shown in said Figure 1, so that said leg portions 16 and 18, as well as said sunken seat portion 14, will rest evenly on a supporting member.

In Figure 1 of the drawings there is illustrated a pipe hanger assembly in which a plurality of my saddle devices, of various sizes, support pipes P of various sizes. Drop or hanger rods R are shown, which commonly extend downwardly from a ceiling, not shown, between which is a pipe supporting member held in position by nuts N on said rods R. This supporting member is shown, in cross section, in the form of a T having a projecting leg portion L and the usual cross-piece C underlying said leg portion L. Each said leg portion L extends into said slots 20 and 22 the full distance of the latter, hence said sunken seat portions 14 as well as said leg portions 16 and 18 seat directly on said supporting members. It makes no difference how many different sizes of both pipes P and my devices are supported, since, in each, the slots extend inwardly the same distance and the sunken seat positions extend downwardly the same distance, hence the three points of contact of each said device on said supporting member are in the same plane.

My devices are commonly formed as integral units, being stamped out of single pieces of metal. Since one important purpose they serve is to prevent corrosion between the pipes P and supporting members, they are usually coated heavily with copper or any other non-corrosive material.

What I claim is:

A pipe hanger assembly comprising, in combination, an inverted, T-shaped, supporting bar, means holding said supporting bar in suspended position, and a one-piece saddle device of sheet material embodying two spaced portions at opposite sides of said device, a depressed seat portion between said spaced portions, and two legs depending from said spaced portions farther than said seat portion, each said leg having a slot extending from the lower extremity thereof upwardly and terminating at a shoulder at an intermediate point of said leg, the under surface of said sunken seat and said shoulders being in contact with and supported by the leg of said inverted, T-shaped bar.

References Cited in the file of this patent

UNITED STATES PATENTS

| | | |
|---|---|---|
| 868,694 | Parks | Oct. 22, 1907 |
| 1,070,921 | Saltiel | Aug. 19, 1913 |
| 2,050,510 | Thoms | Aug. 11, 1936 |

OTHER REFERENCES

Engineer News-Record (page 121) of April 4, 1918. (Copy in Div. 33).